United States Patent [19]

Avery et al.

[11] Patent Number: 4,477,925
[45] Date of Patent: Oct. 16, 1984

[54] CLIPPED SPEECH-LINEAR PREDICTIVE CODING SPEECH PROCESSOR

[75] Inventors: James M. Avery, Wichita; Elmer A. Hoyer, Bel Aire, both of Kans.

[73] Assignee: NCR Corporation, Dayton, Ohio

[21] Appl. No.: 329,776

[22] Filed: Dec. 11, 1981

[51] Int. Cl.³ .............................................. G10L 1/00
[52] U.S. Cl. .................................... 381/43; 364/513.5
[58] Field of Search ............................. 381/41, 42, 43; 364/513.5

[56] References Cited

U.S. PATENT DOCUMENTS

| | | | |
|---|---|---|---|
| 3,071,652 | 1/1963 | Schroeder | 381/40 |
| 3,278,685 | 10/1966 | Harper | 381/41 |
| 3,416,080 | 12/1968 | Wright et al. | 381/41 |
| 3,742,146 | 6/1973 | Newman et al. | 381/49 |
| 3,816,722 | 6/1974 | Sakoe et al. | 381/43 |
| 4,015,088 | 3/1977 | Dubnowski et al. | 381/49 |

OTHER PUBLICATIONS

Hellwarth et al., "Automatic Conditioning of Speech Signals", IEEE Trans. on Audio etc., Jun. 1968, pp. 169-179.

Primary Examiner—E. S. Matt Kemeny
Attorney, Agent, or Firm—J. T. Cavender; Edward Dugas; Arthur A. Sapelli

[57] ABSTRACT

The present invention relates to a speech recognition system and the method therefor, which analyzes a sampled clipped speech signal for identifying a spoken utterance. An input signal representative of the spoken utterance is passed through a clipper to generate a clipped input signal. A sampler generates a plurality of discrete binary values, each discrete binary value corresponding to a sample value of the clipped input signal. A processor then analyzes the plurality of sample values thereby identifying the spoken utterance. Analysis includes determining linear prediction coefficients of the autocorrelation function of speech utterences.

4 Claims, 12 Drawing Figures

FIG. 2A
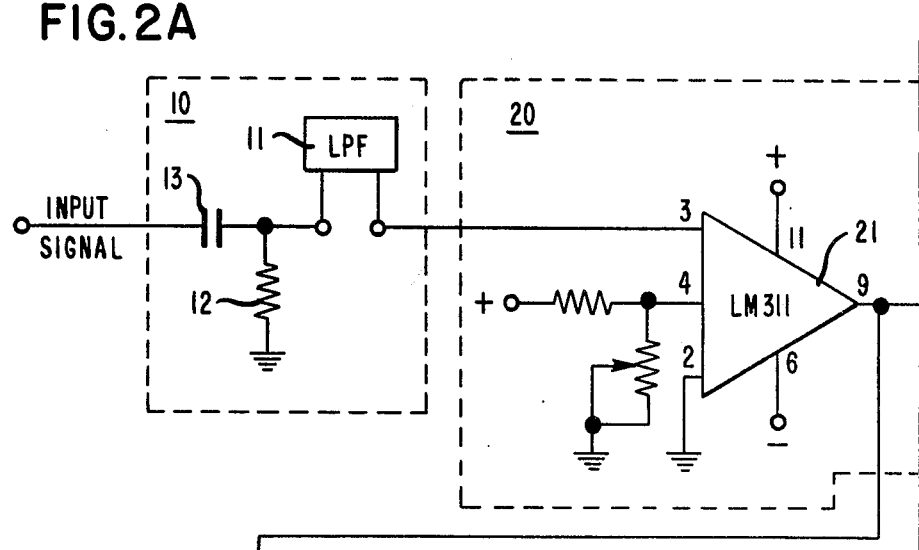
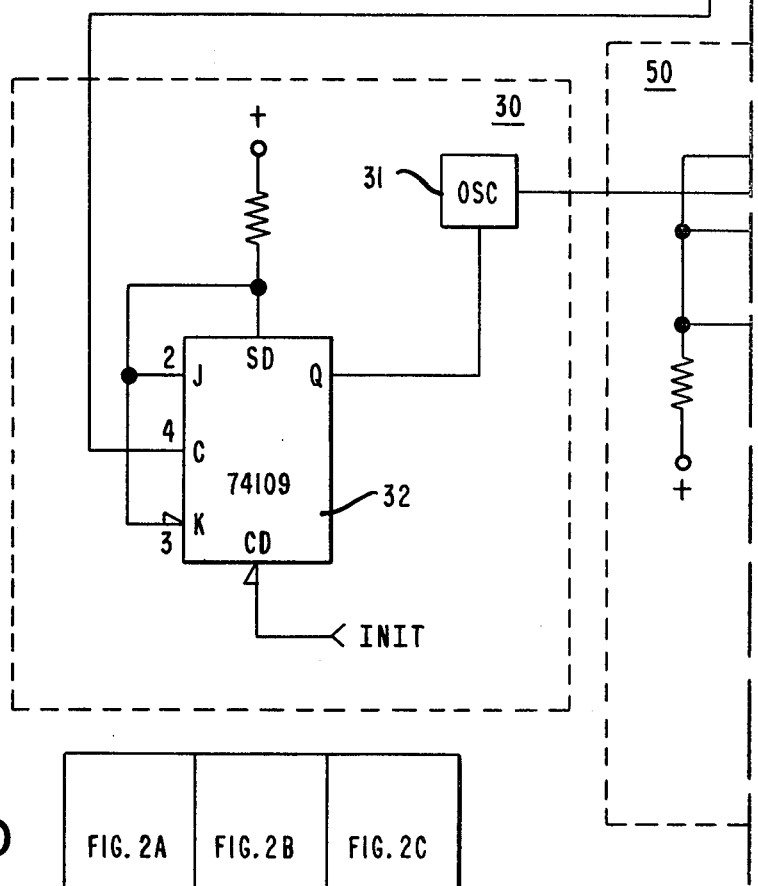
FIG. 2D
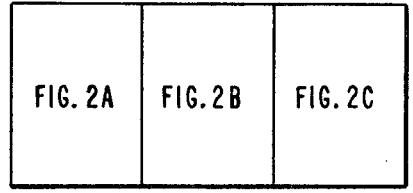

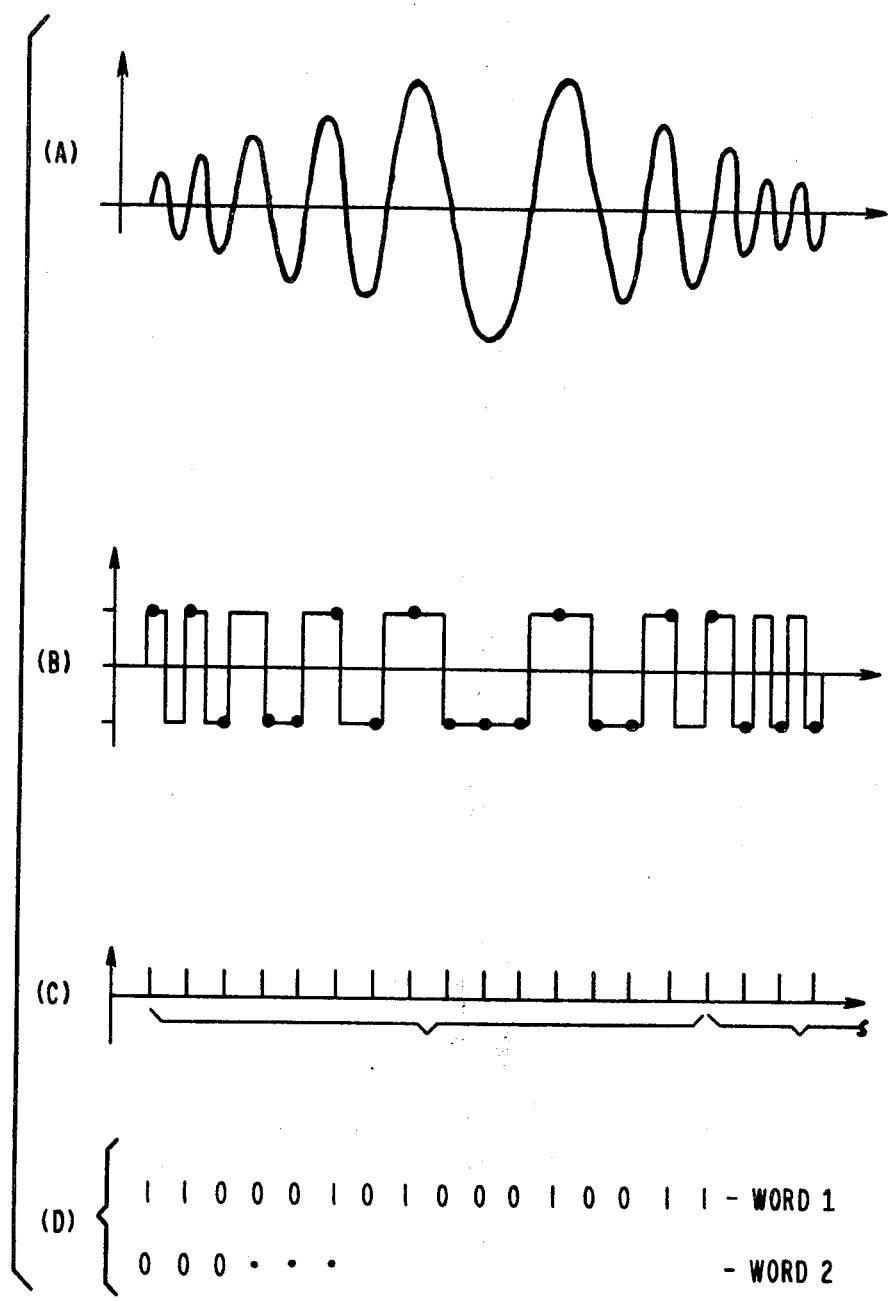

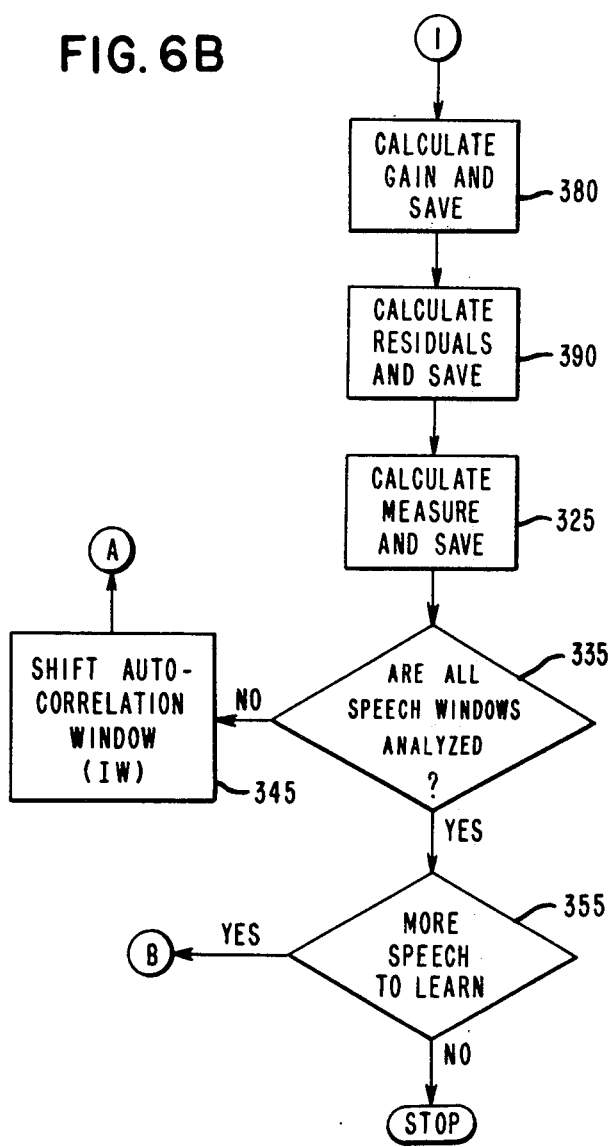

CLIPPED SPEECH-LINEAR PREDICTIVE CODING SPEECH PROCESSOR

BACKGROUND OF THE INVENTION

The present invention relates to speech recognition systems and more particularly, to a system for recognizing an utterance as one of a plurality of reference utterances, and the method therefor.

In communication, data processing and control systems, it is often desirable to utilize speech as direct input for data, commands, or other information. Speech input arrangements may be utilized to record transactions, to record and request information, to control machine tools, or to permit a person to interact with data processing and control equipment without diverting attention from other activity. Because of the complex nature of speech, its considerable variability from speaker to speaker and variability even for a particular speaker, it is difficult to attain perfect recognition of speech segments.

One type of priorly known speech recognition system converts an input speech signal into a sequence of phonetically based features. The derived features, generally obtained from a spectral analysis of speech segments, are compared to a stored set of reference features corresponding to the speech segment or word to be recognized. If an input speech segment meets prescribed recognition criteria, the segment is accepted as the reference speech segment. Otherwise it is rejected. The reliability of the recognition system is thus highly dependent on the prescribed set of reference features and on the recognition criteria.

Another type of speech recognition system disclosed in the article "Minimum Prediction Residual Principle Applied to Speech Recognition," by Fumitada Itakura in the IEEE Transactions on Acoustics, Speech, and Signal Processing, February 1975, pages 67-72, does not rely on a prescribed set of spectrally derived phonetic features but instead obtains a sequence of vectors representative of the linear prediction characteristics of a speech signal and compares these linear prediction characteristic vectors with a corresponding sequence of reference vectors representative of the linear prediction characteristics of a previous utterance of an identified speech segment or word. As is well known in the art, linear prediction characteristics include combinations of a large number of speech features and thus can provide an improved recognition over arrangements in which only a limited number of selected spectrally derived phonetic features are used.

The prior art systems mentioned above require the use of an A-D converter in order to digitize the input speech signal, the digitized quantities being stored for subsequent processing by a digital computer or processor. The amount of storage required to store the digitized quantities, while dependent upon the sampling rate, can be extremely large. Therefore, there exists a need for a speech recognition system which would eliminate the plurality of spectral filters, eliminate the bulky and costly A-D converters, and reduce memory requirements of the prior art systems while maintaining a high degree of speech recognition capability, and also be more readily implementable in VLSI technology.

SUMMARY OF THE INVENTION

In accordance with the present invention there is provided a speech recognition system which comprises a clipping element, having an input terminal adapted to receive an input signal representative of a spoken utterance, to generate a clipped input signal. An element for sampling the clipped input signal, which is operatively connected to the means for clipping, generates a plurality of discrete binary values, each discrete binary value corresponding to a sample value of the clipped input signal. An element for analyzing the plurality of sample values thereby identifies the spoken utterance.

The method of speech recognition of the present invention comprises the steps of clipping an input signal representative of a spoken utterance to generate a clipped input signal. The clipped input signal is sampled, generating a plurality of discrete binary values, each discrete binary value corresponding to a sample value of the clipped input signal. The plurality of sample values is then analyzed thereby identifying the spoken utterance.

In a preferred embodiment, a signal recognition system of the present invention includes a signal quantizer having an input terminal for receiving an analog input signal and an output terminal. The signal quantizer is designed to quantize the input signal into binary values on its output terminal. A sampler is connected to the output terminal of the signal quantizer for periodically sampling the binary value on the output terminal and generating a string of binary bits responsive thereto. An analyzer is included which is responsive to each string of bits generated by the sampler and operative to determine autocorrelation functions of each string of bits produced by the sampling means for providing a discernible representation thereof.

Accordingly, it is an object of the present invention to provide a speech recognition system.

It is another object of the present invention to provide a speech recognition system with reduced memory requirements.

It is a further object of the present invention to provide a binary speech recognition system.

These and other objects of the present invention will become more apparent when taken in conjunction with the following description and attached drawings, wherein like characters indicate like parts, and which drawings form a part of the present invention.

BRIEF DESCRIPTION OF THE DRAWINGS

FIGS. 2A through 2C, which taken together as shown in FIG. 2D, comprise FIG. 2, shows a logic diagram of the digital computer input elements for the speech recognition system of the preferred embodiment;

FIG. 3 shows the waveforms associated with the various logic elements of FIG. 2;

FIGS. 6A and 6B is a detailed flow of the learn mode of FIG. 4; and

DETAILED DESCRIPTION

Figure 1:
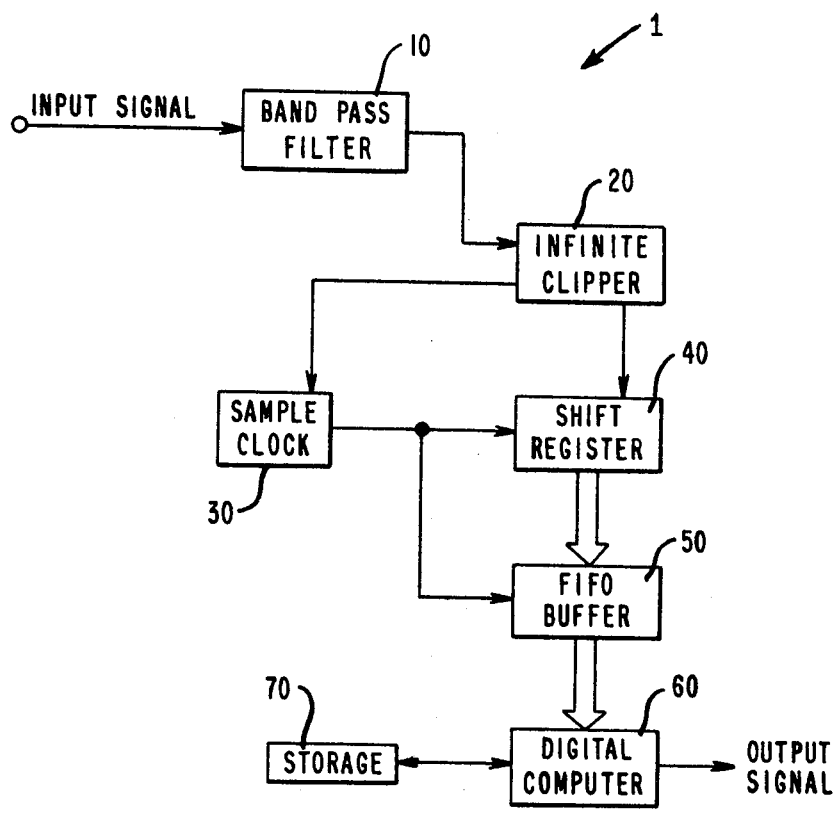
FIG. 1 shows a block diagram of the preferred embodiment of the speech recognition system of the present invention.

Referring to FIG. 1, there is shown a block diagram of the preferred embodiment of the speech recognition system of the present invention. The speech recognition system 1 comprises a bandpass filter 10 which receives an INPUT SIGNAL. The INPUT SIGNAL is an electrical signal representation of the uttered speech provided by a transducer or electroacoustical device (not shown). An infinite clipper 20 is operatively connected to a sample clock 30, a shift register 40 and the bandpass filter 10. A first in-first out buffer (FIFO buffer) 50 operates as a buffer between a digital computer 60 and the shift register 40, the FIFO buffer 50 and shift register 40 being clocked by the sample clock 30. The digital computer 60 has an associated storage 70 for providing storage capability, and outputs a signal (OUTPUT SIGNAL) which is a digital quantity, in BCD or other appropriate format, indicative of the recognized speech utterance.

The operation of the speech recognition system 1 will now be described generally in conjunction with FIGS. 2 and 3.

A speech utterance contains a multiplicity of resonant frequency components which are modified dynamically by the characteristics of an individual's vocal and nasal tracts during the speech utterance. (A speech utterance refers to a word or group of words spoken in a continuous chain and is not meant to refer to a grunt or other unintelligible sound.) These resonant characteristics or frequencies are called the formant frequencies and reside in a spectral band as follows:

F0: 0–300 Hz (fundamental)
F1: 200–999 Hz
F2: 550–2700 Hz
F3: 1100–2950 Hz

Fundamental formant F0 contributes significantly to the "pitch" of the uttered speech but contains little intelligence. Formants F4 and F5 contribute little in terms of energy in a spectrogram and have been shown to have little effect on the intelligibility of speech. Therefore, in order to eliminate the fundamental formant F0, and in order to eliminate the higher frequency formants which contribute little intelligence, the INPUT SIGNAL is passed through bandpass filter 10.

Figure 2B:
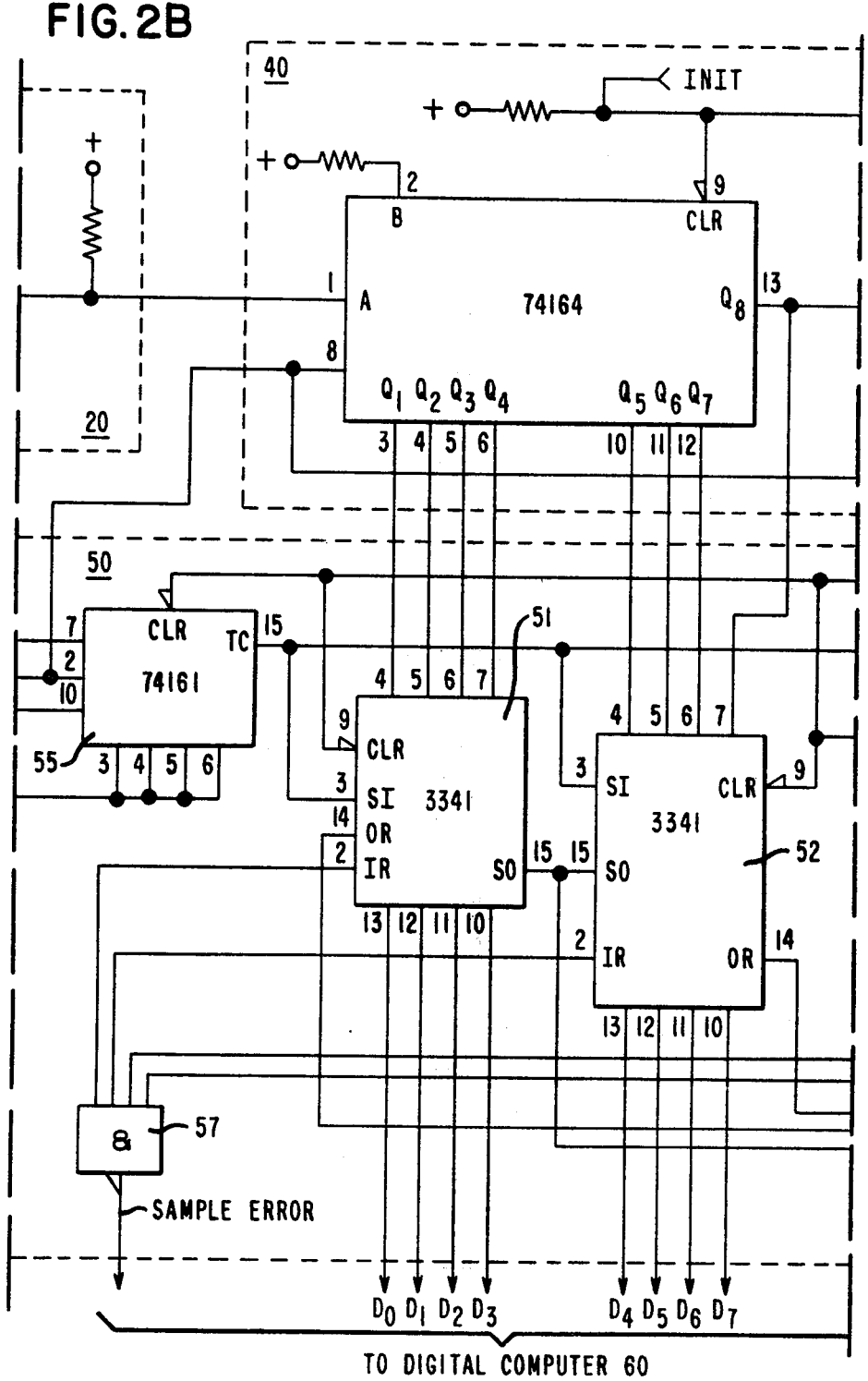
Figure 2C:
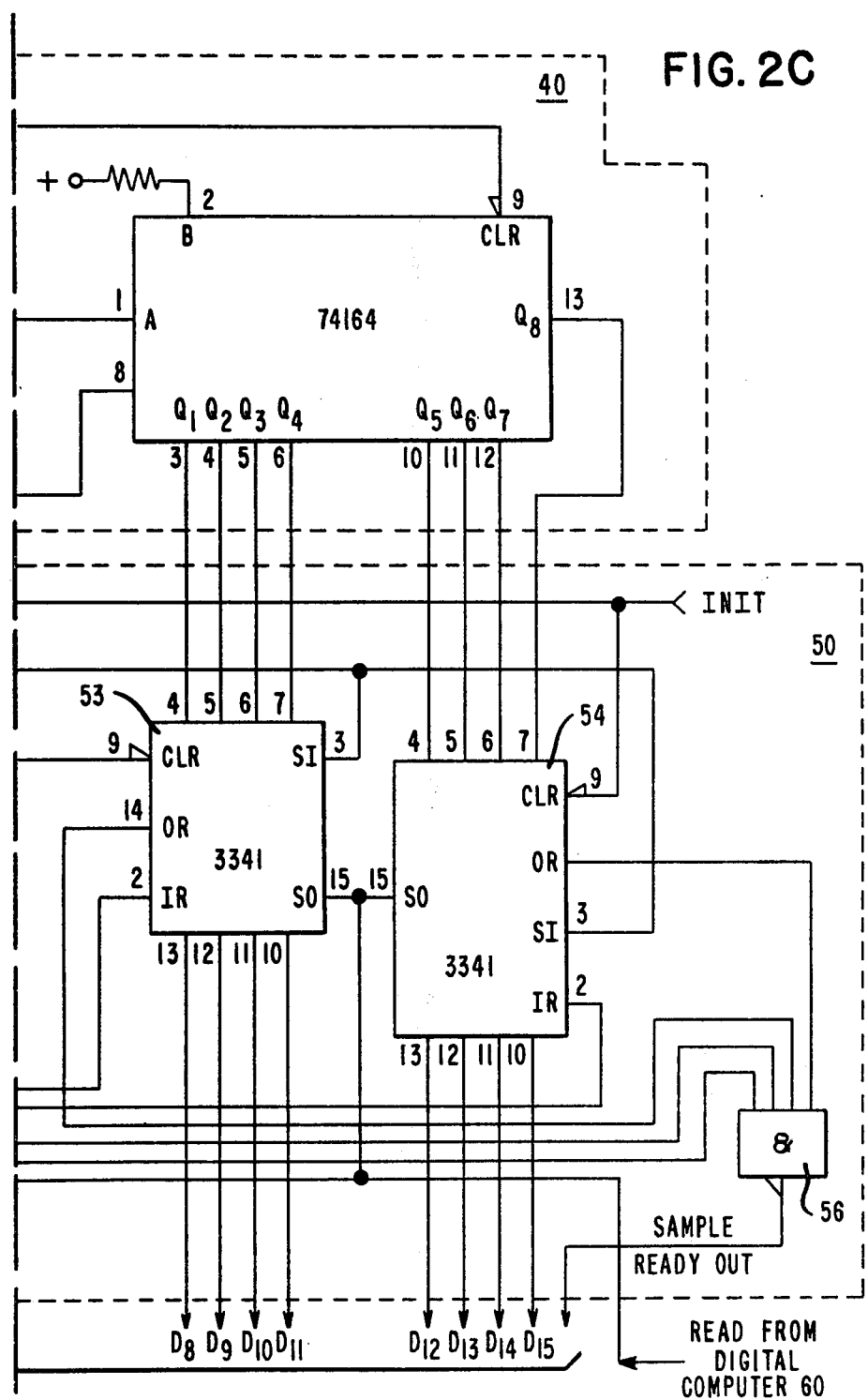

Referring to FIG. 2, bandpass filter 10 comprises a low pass filter 11, in conjunction with a resistor 12 and capacitor 13 which comprises a high pass filter. In the preferred embodiment, the resistor and capacitor values are selected to yield a cutoff frequency of 300 cycles, and the low pass filter 11 is a Khronhite filter having a cutoff frequency of approximately 5 KHz. The output of the bandpass filter 10 results in a filtered input signal as shown in FIG. 3A.

The filtered input signal is then coupled to infinite clipper 20, resulting in a CLIPPED-SPEECH signal as shown in FIG. 3B. The infinite clipper 20 of the preferred embodiment comprises integrated circuit chip LM311 well known in the art. (The numbers around the outside periphery of the chip indicate the pin number and the letters inside the chip indicate a function, e.g., CLR signifying clear.) The resulting output signal from infinite clipper 20, the CLIPPED-SPEECH signal, is coupled to a shift register 40. The shift register 40 of the preferred embodiment comprises two integrated circuit chips 74164. The shift register 40 performs the sampling and the serial to parallel transfer of a sampled CLIPPED-SPEECH signal, under the control of sample clock 30. When the shift register 40 is full, the contents of the shift register 40, a data word, is then shifted in parallel to the FIFO buffer 50 under control of sample clock 30. The number of stages of shift register 40 is selected to correspond to a data word size of digital computer 60.

The digital computer 60 accepts the data word from the FIFO buffer 50 from the data output lines D0 through D15, the transfer being controlled by a handshaking interface which comprises the READ signal from digital computer 60 and the SAMPLE READY OUT signal from FIFO buffer 50.

In the preferred embodiment, the FIFO buffer 50 comprises four 3341 integrated circuit chips 51–54 and the control section 55 comprises integrated circuit chip 74161. Two NAND-gates 56, 57 combine control signals from the four 3341 integrated circuit chips 51–54 to yield a SAMPLE ERROR signal and the SAMPLE READY OUT signal, these signals comprising part of the interface with the digital computer 60. In the preferred embodiment, the sample clock 30 comprises oscillator 31 and gate 32. The oscillator 31 utilized is a Wavetek 159 programmable signal generator which can be turned on under control of gate 32, gate 32 comprising a J-K flip-flop, integrated circuit chip 74109. It will be recognized by those skilled in the art that any oscillator may be substituted which has the function and characteristics utilized in the preferred embodiment. The clock input (C) of gate 32 is operatively connected to the output of infinite clipper 20 for detecting when the CLIPPED-SPEECH signal is present and is to be sampled. A reset or initialization signal, INIT, is provided for the speech recognition system 1.

The digital computer 60 of the preferred embodiment is a Hewlett-Packard 2117F computer with 512k bytes of main memory. Storage 70 is provided by a 125M byte HP7925 disk drive. The computer operating system is Hewlett-Packards Real Time Environment RTE IV B Software, and the data base architecture is supported by Hewlett-Packards IMAGE 1000 Data Base Management System Software. It will be recognized by those skilled in the art that a variety of processors or digital computers may be utilized without departing from the scope of the invention. It will also be further recognized that the various elements of the speech recognition system 1 may be modified within the scope and spirit of the present invention.

Referring to FIGS. 3B and 3C, it can be seen that the sampling of the CLIPPED-SPEECH signal results in a discrete value of $+V$ or $-V$ for each sample, which is subsequently translated to a logic 1 or a logic 0, respectively. Each sample is then represented by a single bit, the 16-bit words stored in storage 70 as shown in FIG. 3D thereby containing 16 sample values. It will be understood, that under previous digital techniques of speech recognition not utilizing clipped speech (clipped speech implies infinite clipped speech herein unless otherwise noted) each sample comprises a digital quantity, the digital quantity being made up of a number of bits. The number of bits may be a byte, computer word, etc. In the previous digital speech recognition systems mentioned above, if sixteen bits are required to yield the desired results, then it can be seen that a sixteen to one reduction of memory is obtained in the clipped speech system of the present invention. Hence, storage 70 has stored therein all the sampled clipped speech data read from FIFO buffer 50 by the digital computer 60. After the speech utterance is in storage 70 in the sampled clipped-speech format, the digital computer analyzes the stored data to yield the recognized speech, the digital computer processing to be discussed in detail hereinunder.

The oscillator 31 frequency determines the sampling rate. The sampling rate of the system of the present invention should be sufficient to maintain zero crossing accuracy. A nominal sampling rate utilized by the system of the present invention is 24 KHz. It will be understood by those skilled in the art that the values, parameters, etc., contained herein are intended for illustrative purposes only to aid in the understanding of the concept and implementation of the present invention and is not intended in any way to limit the scope of the present invention.

Figure 4:
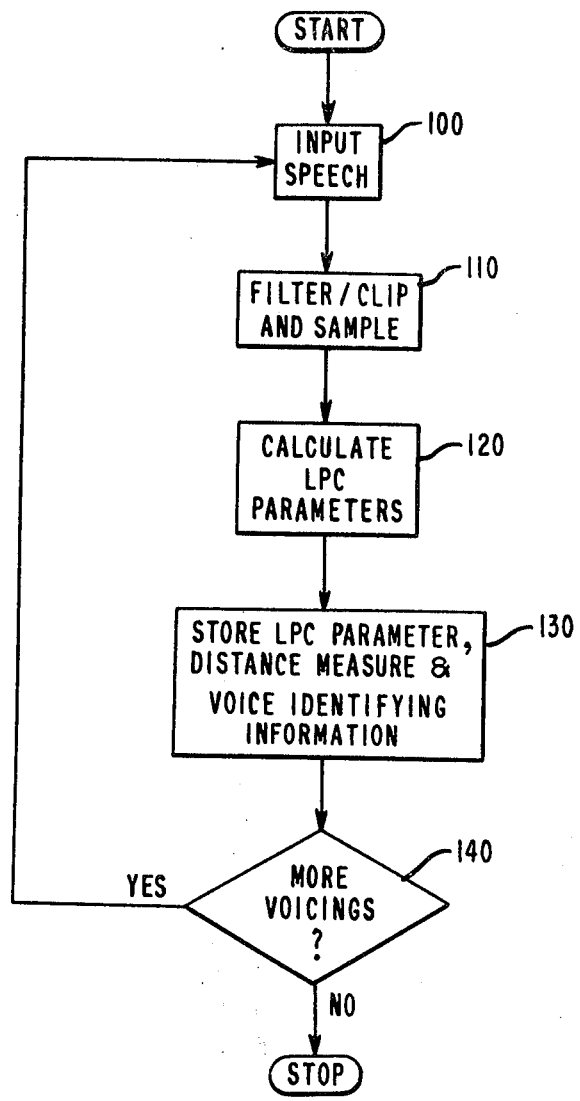
FIG. 4 is a flow diagram of the data base building process, or learn mode, of the present invention.

Referring to FIG. 4, there is shown a block diagram of the learn process of the speech recognition system 1 of the present invention. The learn process refers to the building of the data base for the speech to be recognized. This data base is also referred to herein as the learned speech, vocabulary, and dictionary. The input speech is input to the system both verbally (i.e., via the INPUT SIGNAL discussed above) and also via an input device for identifying the verbal input (block 100). The INPUT SIGNAL is then filtered, clipped and sampled (block 110) and inputted to the digital computer 60. The digital computer calculates the linear predictive coding (LPC) parameters (block 120) and then stores the respective LPC parameters, distance measures, and identifying voice information (blocks 131, 132, 133). These stored quantities are stored in storage 70 consistent with data base management techniques well known in the art. If any more input speech or voicings are to be made (block 140), block 100 is repeated. If no more voicings are to be made, the process stops.

Figure 5:
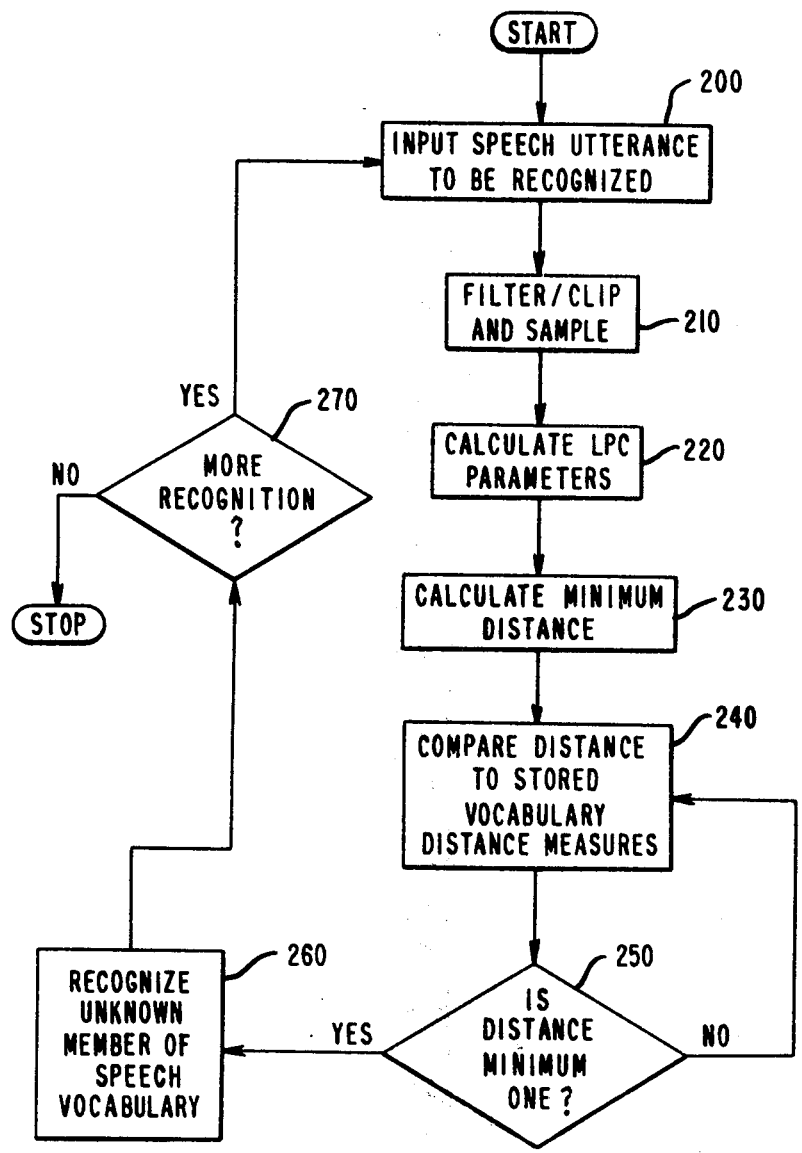
FIG. 5 is a general flow diagram of the recognition process or mode of the present invention.

Once the data base has been established, the speech recognition system 1 is ready to perform the recognition process. Referring to FIG. 5, there is shown a flowchart of the recognition process of the speech recognition system 1 of the present invention. The speech utterance to be recognized is inputted into the speech recognition system 1 (block 200). The INPUT SIGNAL is then filtered, clipped and sampled (block 210) and then inputted to the digital computer 60. The digital computer 60 then calculates the LPC parameters (block 220) and calculates the minimum distance (block 230). The distance measure calculated is then compared to the distance measure stored in the data base (block 240) and repeats the comparison process until the minimum distance measure is found (block 250). When the minimum distance measure is found, the computer outputs the identifying voice information stored in the data base with the associated parameters determined as the OUTPUT SIGNAL (block 260). If any further voice recognition is to be performed (block 270), the process repeats at block 200, otherwise the process halts.

A linear prediction analysis of the sampled clipped-speech signal y(n) is made by digital computer 60 in accordance with $$y(n) = - \sum_{k=1}^{p} a_k y(n - k) \quad (1)$$

where n = 1 to N, N being the number of samples within a window, and p is the number of poles of a prediction analysis model. The linear prediction analysis is based on the all-pole linear prediction filter model well known in the art.

The linear prediction coefficients $a_k$, or more simply referred to herein as coefficients $a_k$, are the coefficients of the sampled clipped-speech signal y(n) in accordance with the representation of equation (1). In the preferred embodiment a 16-pole filter model is used. It is to be understood, that other pole arrangements may be used.

The coefficients $a_k$, are the coefficients of the sampled speech signal y(n) in accordance with the representation of equation (1). For the 16-pole filter model used in the preferred embodiment, the coefficients a(1) through a(16) are generated by the digital computer 60 for each window of N samples by the short term autocorrelation analysis in accordance with Equations (2). Since the digital filter model is representative of the sampled clipped-speech for a time period of approximately 10–12 ms, it is desirable to update the coefficients $a_k$ about every 10 ms. For a sample rate of 24 KHz, there are 256 samples (i.e., N=256) in a window time of 10.6 ms. The number of windows is dependent upon the length of time of the speech utterance $T_1$, namely $T_1 \div$ time of window.

$$-R(i) = \sum_{k=1}^{p} a_k R(i - k), \, 1 \leq i \leq p \quad (2)$$

R(i) and R(i-k), Equation (3), are arrived at through windowing of sampled clipped-speech signal y(n).

$$R(i - k) = \frac{1}{N} \sum_{n=1}^{N} y(n - k) y(n - i), \quad (3)$$
$$1 \leq i \leq p$$
$$n = 1,2,3 \ldots N.$$

As discussed above, the actual clipped speech sampled values $\pm V$ (or normalized to $\pm 1$) are replaced via the infinite clipper 20 with a corresponding binary value (binary 1 for $+V$ and binary 0 for $-V$). The LPC method utilizes the clipped speech sampled values of $\pm V$, the binary 1 or binary 0 being a sample value, as stored in storage 70 for the value of the signal y(n). Equation (2) forms a set of "p" equations with "p" unknowns in the form.

$$\begin{bmatrix} R(0) & R(1) & R(2) & \ldots R(p-1) \\ R(1) & R(0) & R(1) & \ldots R(p-2) \\ \cdot & \cdot & \cdot & \cdot \\ \cdot & \cdot & \cdot & \cdot \\ \cdot & \cdot & \cdot & \cdot \\ R(p-1) & R(p-2) & R(p-3) & \ldots R(0) \end{bmatrix} \begin{bmatrix} a_1 \\ a_2 \\ \cdot \\ \cdot \\ \cdot \\ a_k \end{bmatrix} =$$

$$- \begin{bmatrix} R(1) \\ R(2) \\ \cdot \\ \cdot \\ \cdot \\ R(k) \end{bmatrix}$$

The Levinson recursion method is used to solve the "p" linear equations. The p×p autocorrelation matrix is symmetric with identical elements along the diagonals and is identified as a Toeplitz matrix. The $a_k$ coefficients, resulting from the solution of Equation 2 for each short time segment of sampled speech, are stored in a data base structure within storage 70. These stored $a_k$ parameters are then used as elements comparison templates during the recognition process.

Figure 6A:
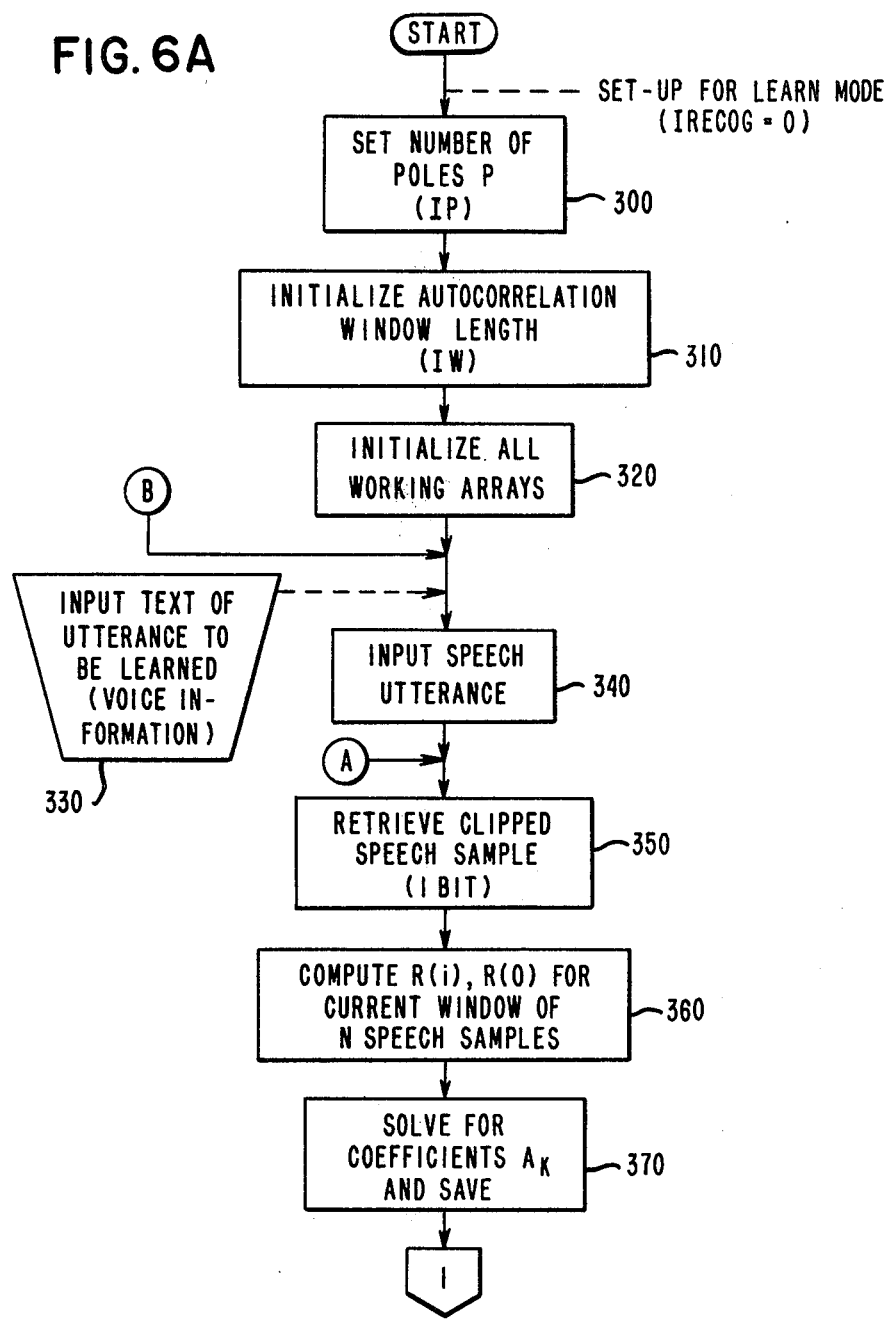

The processing by the digital computer 60 will now be described in conjunction with FIG. 6, which comprises FIGS. 6A and 6B. The process described in FIG. 6 will be what is referred to as the learn mode, i.e., setting up the data bases to contain the vocabulary or dictionary for the speech utterances to be recognized. A second mode of the program, the recognition mode, is also included in the same program. It will be recognized by those skilled in the art that the programs may be separated. If a fixed data base vocabulary or learned speech is established and resides in storage 70, there is no need to perform the learn mode. Because of the common processing between the two modes, the programs for each mode are combined into a single program.

Referring to FIG. 6, after the learn mode has been established (IRECOG=0) the program sets the number of poles (IP) (block 300), initializes the autocorrelation window (IW) (block 310), and initializes all the working arrays contained within the program (block 320). (The mnemonics IRECOG, IW, and IP are symbols used in the program which is included herein as Appendix I). At this point, an input of the text (voice identifying information) of the utterance to be stored in the data base is input by an input device (block 330). The input speech utterance (verbal input or voicing) is then inputted to the speech recognition system 1 (block 340) and goes through the filtering, clipping and sampling process described above. The binary information is then stored in storage 70. When the complete utterance has been stored in storage 70, the program begins the analysis. The program retrieves a clipped speech sample of one bit (block 350) and computes R(i) and R(0) for the current window of N speech samples (block 360) in accordance with Equations (4) and (5).

$$R(0) = \sum_{n=1}^{N} y^2(n) \quad (4)$$

$$-R(i) = \sum_{n=1}^{N} y(n)y(n-i), 1 \leq i \leq p \quad (5)$$

where,
P is the number of poles,
N is the number of samples in a window, and
n is the individual sample instant.

The program then solves for the coefficients $a_k$ using the Levinson recursion method in accordance with Equation (6), and saves the coefficients $a_k$ in the data base (block 370). The program then calculates the gain G in accordance with Equation (7) and saves that information in the data base (block 380), and calculates the residuals in accordance with Equation (8) and saves the results in the data base (block 390).

$$-R(i) = \sum_{k=1}^{p} a_k R(i-k), 1 \leq i \leq p \quad (6)$$

$$G = \sqrt{\left| R(0) + \sum_{k=1}^{p} a_k R(i-k) \right|} \quad (7)$$

$$R = \sum_{k=1}^{p} a_k R(k) \quad (8)$$

The program then calculates the measure (or distance measure) in accordance with Equation (9), and saves that information in the data base (block 325).

$$d = \sum_{n} \left[ \sum_{k=1}^{p} a_k R(k) \right] \quad (9)$$

If all the speech windows have not been analyzed (block 335), the program shifts the autocorrelation window (IW) (block 345) and repeats the process starting at block 350. If all the speech windows have been analyzed and more speech is to be learned (block 355), the process repeats starting with block 340. If there is no more speech to learn, i.e., the data base vocabulary or dictionary of learned speech is completed, the program stops.

Figure 7A:
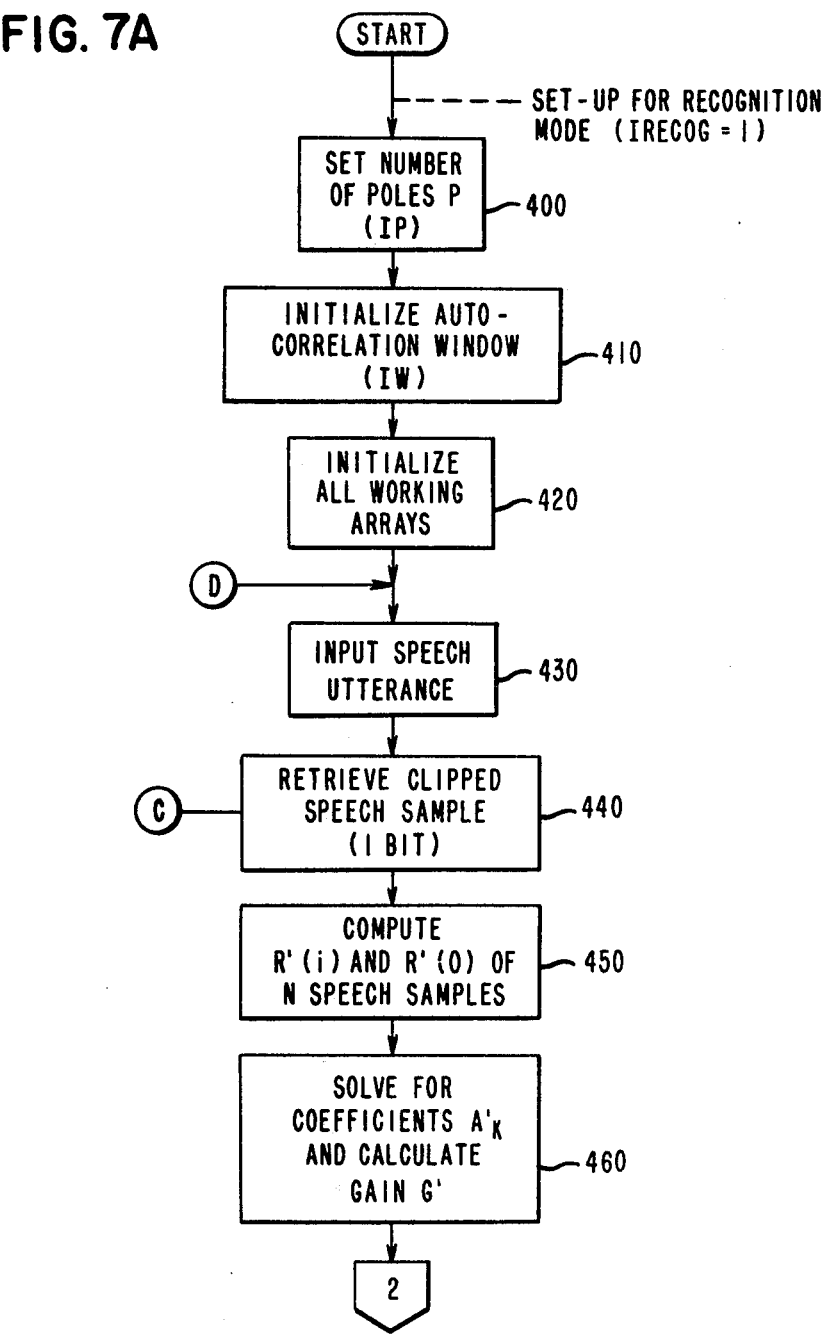
FIGS. 7A through 7B is a detailed flow diagram of the recognition mode of FIG. 5.
Figure 7B:
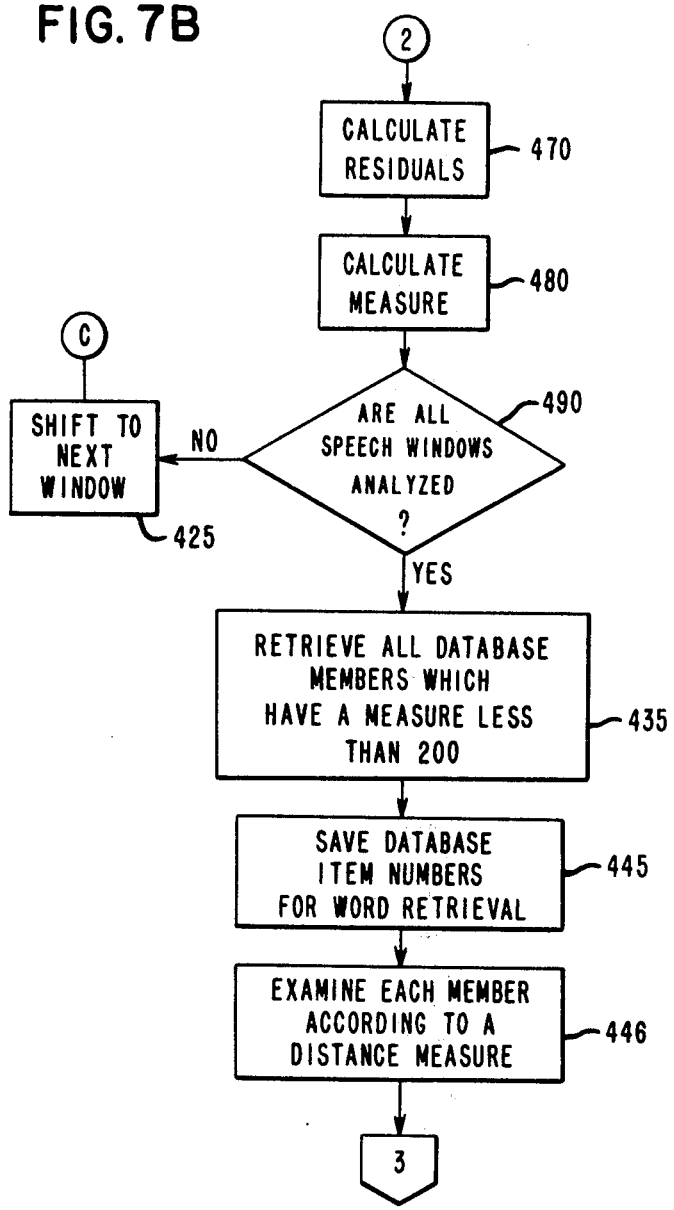
Figure 7C:
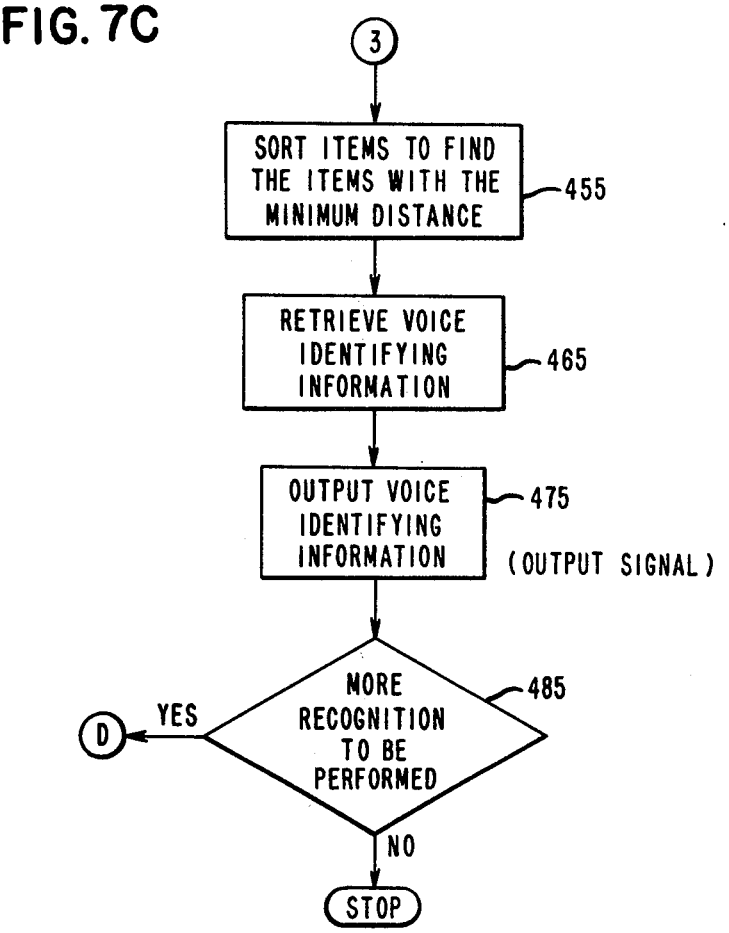

Referring to FIG. 7 which comprises FIGS. 7A, 7B, and 7C, the recognition mode will now be described. Once the digital computer 60 has been set up for the recognition mode (IRECOG=1), the process starts by initializing the program which comprises setting the number of poles p (IP)(block 400), initializing the autocorrelation window (IW) (block 410), and initializing all working arrays (block 420). The speech utterance is then inputted (block 430) and is filtered, clipped, sampled, and stored in storage 70. After all the information has been stored in storage 70, the digital computer 60 then proceeds with processing the speech utterance as stored in storage 70. The program retrieves a single clipped speech sample of one bit (block 440). The program computes R'(i) and R'(0) of N speech samples (block 450) in accordance with Equations (4) and (5). (The "prime" indicates the speech parameters to be recognized, or "unknown" speech parameters versus the parameters stored in the data base.) The program then calculates the gain G' in accordance with Equation (7) and solves for coefficients a'k (block 460) in accordance with Equation (6). The program calculates the residuals (block 470) in accordance with Equation (10) and then calculates the measure for the unknown speech input (block 480) in accordance with Equation (9).

$$R = \sum_{k=1}^{p} a'_k R'(k) \quad (10)$$

If all the speech windows have not been analyzed (block 490), the program shifts to the next window (block 425) and repeats the processing starting with block 440. If all the speech windows have been analyzed, the program retrieves all the data base members which have a measure in accordance with Equation (11) less than a predetermined value, the predetermined value of the distance measure of the preferred embodiment being 200 (block 435). The data base item numbers $$d = \sum_{n} \left[ \sum_{k=1}^{p} a_k R(k) - \sum_{k=1}^{p} a'_k R'(k) \right] \quad (11)$$

for the words retrieved are saved (block 445), and each member retrieved is examined according to a distance measure specified by Equations (12) or (13) (block 446). The distance measure of the preferred embodiment utilized in block 446 is that specified by Equation (13).

It will be recognized by those skilled in the art that many types of distance measures exist and may be employed herein without departing from the spirit and scope of the invention.

$$d = \sum_n \sqrt{\left|\left[\sum_{k=1}^{p} a_k R(k)\right]^2 - \left[\sum_{k=1}^{p} a'_k R'(k)\right]^2\right|} \quad (12)$$

$$d = \frac{\sum_{k=1}^{p} a_k R(k)}{\sum_{k=1}^{p} a'_k R'(k)} \quad (13)$$

The items are then sorted to find the item with the minimum distance (block 455). The item having the minimum distance can then be retrieved using the item pointer, the information contained in the retrieved item includes the voice identifying information thereby identifying the speech utterance from the previously-learned vocabulary (block 465). The program then outputs the voice identifying information which constitutes the OUTPUT SIGNAL (block 475). If more speech is to be recognized (block 485), the program repeats the process starting at block 430. If no more recognition is to be performed, the program stops.

Although the above description has been directed to a speech recognition whereby the INPUT SIGNAL is representative of uttered speech, it will be recognized that the system may be capable of recognizing any analog input signal representative of some phenomenon, event, occurrence, material characteristic, information, quantity, parameter, etc. in which there may be defined an associated set of reference features capable of identification, consistent with the concepts described herein.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

APPENDIX I

```
0001    FTN4,L
0002    C       MAIN PROGRAM
0003            PROGRAM VOICE  (3,80)
0004            COMMON/I99/INITR/C99/ICNTR
0005            COMMON/GLOBL/IARRY(2000),ISTAT(10),ISCTR,ISECT,ISTRK,IWORD(24),
0006           *AUTOK(20),R(20),A(20,20),REFLC(20),ALPHA(20),RDIST(20),
0007           *RESID(300),TDIST,IPRAM(5),IBASE(8),IRTN,ICISC,IEND,
0008           *IP,IW,IRECOG,LU,ILIST(45),LISTI(45),IBUF(45,6),
0009           *NDIST,MDIST,
0010           *NPHR1,MPHR1,
0011           *NWRDIS,NPHR2,NRESID,
0012           *MWRDIS,MPHR2,MRESID,
0013           *NPHR3,NRAUTO,NGAIN,
0014           *MPHR3,MRAUTO,MGAIN
0015    C
0016            CALL RMPAR(IPRAM)
0017            IP=IPRAM(1)
0018            IW=IPRAM(2)
0019            IRECOG=IPRAM(3)
0020            LU=IPRAM(4)
0021            WRITE(LU,500)INITR,ICNTR
0022            LU1=39
0023    500 FORMAT(1H ,O8,5X,O8)
0024    C
0025    C
0026            ASSIGN 10 TO IRTN
0027            CALL EXEC (8,5HVOINF)
0028    10  DO 20 I=1,24
0029            IWORD(I)=2H
0030    20  CONTINUE
0031            IF(IRECOG.EQ.1) GO TO 30
0032            WRITE(LU,100)
0033    100 FORMAT(1H ,"ENTER PHRASE I WILL HERE (24 CHAR. MAX.)"/)
0034            READ(LU,5) IWORD
0035    5   FORMAT(24A2)
0036            IF(IWORD(1).EQ.2H//) GO TO 300
0037    30  CALL FILLS(0,IARRY,2000)
0038            WRITE(LU,200)
0039    200 FORMAT(1H ,"READY TO ACCEPT INPUT SPEECH (6 SEC. DURATION)")
0040            CALL EXEC(3,LU1)
0041            CALL EXEC(1,LU1,IARRY,2000,INITR,ICNTR)
0042            CALL EXEC(8,5HVOPAR)
0043    300 CALL DBCLS(IBASE,DUMMY,1,ISTAT)
```

```
0044            STOP
0045         98 CALL DVR99
0046         99 CALL DBBUF
0047            END
0048            BLOCK DATA GLOBL
0049            COMMON/GLOBL/IARRY(2000),ISTAT(10),ISCTR,ISECT,ISTRK,IKCRC(24)
0050           *AUTOK(20),R(20),A(20,20),REFLC(20),ALPHA(20),RDIST(20),
0051           *RESID(300),TDIST,IPRAM(5),IBASE(8),IRTN,IDISC,IEND,
0052           *IP,IW,IRECOG,LU,ILIST(45),LISTI(45),IBUF(45,6),
0053           *NDIST,MDIST,
0054           *NPHR1,MPHR1,
0055           *NWRDIS,NPHR2,NRESID,
0056           *MWRDIS,MPHR2,MRESID,
0057           *NPHR3,NRAUTO,NGAIN,
0058           *MPHR3,MRAUTO,MGAIN
0059      C
0060            DATA IBASE/2H  ,2HVO,2HIC,2HER,2H J,2HA!,2H46,2H !/
0061            END
0062            SUBROUTINE DBERF(IROUT)
0063            COMMON/GLOBL/IARRY(2000),ISTAT(10),ISCTR,ISECT,ISTRK,IKCRC(24)
0064           *AUTOK(20),R(20),A(20,20),REFLC(20),ALPHA(20),RDIST(20),
0065           *RESID(300),TDIST,IPRAM(5),IBASE(8),IRTN,IDISC,IEND,
0066           *IP,IW,IRECOG,LU,ILIST(45),LISTI(45),IBUF(45,6),
0067           *NDIST,MDIST,
0068           *NPHR1,MPHR1,
0069           *NWRDIS,NPHR2,NRESID,
0070           *MWRDIS,MPHR2,MRESID,
0071           *NPHR3,NRAUTO,NGAIN,
0072           *MPHR3,MRAUTO,MGAIN
0073      C
0074      C
0075            IF(ISTAT(1).EQ.0) RETURN
0076            CALL EXEC(8,5HVOCER,IROUT)
0077            END
0078            PROGRAM VOPAR(5)
0079            INTEGER H,F,G
0080            COMMON/I99/INITR/C99/ICNTR
0081            COMMON/GLOBL/IARRY(2000),ISTAT(10),ISCTR,ISECT,ISTRK,IKCRC(24)
0082           *AUTOK(20),R(20),A(20,20),REFLC(20),ALPHA(20),RDIST(20),
0083           *RESID(300),TDIST,IPRAM(5),IBASE(8),IRTN,IDISC,IEND,
0084           *IP,IW,IRECOG,LU,ILIST(45),LISTI(45),IBUF(45,6),
0085           *NDIST,MDIST,
0086           *NPHR1,MPHR1,
0087           *NWRDIS,NPHR2,NRESID,
0088           *MWRDIS,MPHR2,MRESID,
0089           *NPHR3,NRAUTO,NGAIN,
0090           *MPHR3,MRAUTO,MGAIN
0091      C
0092      C
0093            DIMENSION KWORK(800),IWORK(65)
0094            IF(IRECOG.EQ.1) GO TO 2
0095            CALL MOVEW(IWORD,KWORK,24)
0096            CALL DBGET(IBASE,5HREP  ,7,ISTAT,2H@ ,IKCHK,KWORK)
0097            IF(ISTAT(1).EQ.0) GO TO 300
0098            IF(ISTAT(1).EQ.107) GOTO 400
0099            CALL DBERF(9)
0100        300 WRITE(LU,900)
0101        900 FORMAT(1H ,"I HAVE ALREADY LEARNED THIS WORD")
0102            GOTO IRTN
0103        400 CALL SEQU(ILIST,NPHR1)
0104            CALL DBLCK(IBASE,DUMMY,1,ISTAT)
0105            CALL DBERF(10)
0106            CALL DBPUT(IBASE,5HREP  ,1,ISTAT,ILIST,KWCRK)
0107            CALL DBERF(11)
0108            CALL DBUNL(IBASE,DUMMY,1,ISTAT)
0109            CALL DBERF(1)
0110          2 IWD1=0
```

```
0111            TDIST=0.
0112            DO 4 J=1,300
0113            RESID(J)=0.
0114          4 CONTINUE
0115            R0=0.
0116            M=1
0117            IWIDE=IW
0118            IBIT1=1
0119          5 DO 100 I=1,IP
0120            DO 200 N=IBIT1,IWIDE
0121            IWD1=((N-1)/16)+1
0122            IBITP1=(IWD1*16)-N
0123            IBIT2=N-I
0124            IWD2=((IBIT2-1)/16)+1
0125            IBITP2=(IWD2*16)-IBIT2
0126            IF(IBIT2.GT.0) GO TO 10
0127            ISNI=0
0128            GO TO 20
0129         10 CALL RETRS(IARRY,IWD2,IBITP2,ISNI)
0130            IF(ISNI.EQ.0) ISNI=-1
0131         20 CALL RETRS(IARRY,IWD1,IBITP1,ISN)
0132            IF(ISN.EQ.0) ISN=-1
0133            R(I)=R(I)+(ISN*ISNI)
0134            R0=R0+(ISN*ISN)
0135      C     WRITE(6,1003)ISN,ISNI,IWD1,N,IBITP1,IWD2,IBIT2,IBITP2
0136      C1003 FORMAT(1H ,"BITS",10X,F2.4,2X,F2.4,(6(I4,2X)))
0137        200 CONTINUE
0138        100 CONTINUE
0139      C
0140      C
0141      C CALCULATE PREDICTOR COEFFICIENTS
0142      C
0143      C
0144      C INITALIZATION
0145      C
0146      D     WRITE(6,1001)IWORD,R0,(R(I),I=1,16)
0147      D1001 FORMAT(1H ,24A2,2X,/," R0",2X,F10.4/" R(I)",/,2X,(F10.4/))
0148            REFLC(2)=-(R(1)/R0)
0149            A(1,1)=1.
0150            ALPHA(1)=R0
0151            A(1,2)=REFLC(2)
0152            ALPHA(2)=ALPHA(1)*(1.-(REFLC(2)*REFLC(2)))
0153            DO 50 M=2,IP+1
0154            SUM=0.0
0155            DO 40 J=1,M
0156            SUM1=R(M-J+1)*A(M-1,J)
0157            SUM=SUM+SUM1
0158         40 CONTINUE
0159            REFLC(M+1)=-(SUM/ALPHA(M))
0160            A(M,1)=1.0
0161            DO 30 K=1,M-1
0162            A(M,K+1)=A(M-1,K+1)+(REFLC(M+1)*A(M-1,M-K+1))
0163         30 CONTINUE
0164            A(M,M+1)=REFLC(M+1)
0165            ALPHA(M+1)=ALPHA(M)*(1.-(REFLC(M+1)*REFLC(M+1)))
0166      D     WRITE(6,1002)(ALPHA(K),REFLC(K),K=1,20)
0167      C     WRITE(6,1005)((A(F,G),F=1,20),G=1,20)
0168         50 CONTINUE
0169            DO 55 L=1,IP
0170            AUTOK(L)=A(IP+1,L+1)
0171         55 CONTINUE
0172            DO 60 K=1,IP
0173      D1002 FORMAT(1H ,5X,"ALPHA",2X,F10.5,2X,"REFLC",2X,F10.5,2X)
0174      C1005 FORMAT(1H ,2X,"A(K+1,K+1)"/,2X(5(F10.5))/)
0175      D1004 FORMAT(1H ,"AUTOK",15X,F10.8)
0176            SUM2=AUTOK(K)*R(K)
0177            SUM3=SUM3+SUM2
```

```
0178        60 CONTINUE
0179   D       WRITE(6,1004)(AUTOK(I),I=1,20)
0180           GAIN=(R0+SUM3)**0.5
0181           IF(IRECOG.EQ.1) GO TO 68
0182           CALL SEQU(ILIST,NPHR3,NRAUTO,NGAIN)
0183           CALL MOVEW(IWORD,KWORK,24)
0184           CALL MOVEW(AUTOK,KWORK(25),32)
0185           CALL MOVEW(GAIN,KWORK(58),2)
0186           CALL DBLCK(IBASE,DUMMY,1,ISTAT)
0187           CALL DBERF(13)
0188           CALL DBPUT(IBASE,5HSPEAK,1,ISTAT,ILIST,KWORK)
0189           CALL DBERF(14)
0190           CALL DBUNL(IBASE,DUMMY,1,ISTAT)
0191           CALL DBERF(2)
0192        68 DO 65 I=1,16
0193           RESID(H)=RESID(H)+(AUTOK(I)*R(I))
0194        65 CONTINUE
0195           TDIST=TDIST+RESID(H)
0196   D       WRITE(6,1020)(RDIST(I),I=1,16),TDIST
0197   D1020 FORMAT(1H ,"RDIST",2X,F10.8,2X,"TDIST ",F10.8)
0198           H=H+1
0199           IBIT1=IBIT1+IW
0200           IWIDE=IWIDE+IW
0201           SUM2=0.
0202           SUM3=0.
0203           R0=0.
0204           DO 63 I=1,20
0205           AUTOK(I)=0.0
0206           RDIST(I)=0.0
0207           R(I)=0.0
0208           ALPHA(I)=0.0
0209           REFLC(I)=0.0
0210           DO 62 K=1,20
0211           A(I,K)=0.0
0212        62 CONTINUE
0213        63 CONTINUE
0214           IF(IBIT1.GT.32000) GO TO 70
 215           GO TO 5
0216        70 WRITE(LU,1009)  TDIST
0217      1009 FORMAT(1H ,20X,F10.8)
0218           IF(IRECOG.EQ.1) CALL EXEC(8,5HVOCAN)
0219           CALL SEQU(ILIST,NDIST)
0220           CALL DBLCK(IBASE,DUMMT,1,ISTAT)
0221           CALL DBPUT(IBASE,5HWDIST,1,ISTAT,ILIST,TDIST)
0222           CALL DBERF(20)
0223           CALL DBUNL(IBASE,DUMMY,1,ISTAT)
0224           CALL DBERF(21)
0225           CALL SEQU(ILIST,NWRDIS,NPHR2,NRESID)
0226           CALL MOVEW(TDIST,KWORK,2)
0227           CALL MOVEW(IWORD,KWORK(3),24)
0228           CALL MOVEW(IAUTOR,KWORK(27),640)
0229           CALL DBLCK(IBASE,DUMMY,1,ISTAT)
0230           CALL DBERF(15)
0231           CALL DBPUT(IBASE,5HSPOKE,1,ISTAT,ILIST,KWORK)
0232           CALL DBERF(16)
0233           CALL DBUNL(IBASE,DUMMY,1,ISTAT)
0234           CALL DBERF(3)
0235   C
0236   C
0237           GO TO IRTN
0238           END
0239           PROGRAM VOCAN(5)
0240           COMMON/I99/INITR/C99/ICNTR
0241           COMMON/GLOBL/IARRY(2000),ISTAT(10),ISCTR,ISECT,ISTRK,IWCRC(24)
0242          *AUTOK(20),R(20),A(20,20),REFLC(20),ALPHA(20),RDIST(20),
0243          *RESID(300),TDIST,IPRAM(5),IBASE(8),IRTN,ICISC,IEND,
0244          *IP,IW,IRECOG,LU,ILIST(45),LISTI(45),IBUF(45,6),
```

```
0245            *NDIST,MDIST,
0246            *NPHR1,MPHR1,
0247            *NWRDIS,NPHR2,NRESID,
0248            *MWRDIS,MPHR2,MRESID,
0249            *NPHR3,NRAUTO,NGAIN,
0250            *MPHR3,MRAUTO,MGAIN
0251      C
0252      C
0253            DIMENSION IFOUND(800),LBUF(24),IZERO(2),RMACH(100,2),DIFF(100)
0254            DIMENSION T1(2),T2(2),RFOUND(300)
0255      C
0256            DATA IZERO/2*0/
0257      C
0258            CALL DBGET(IBASE,5HWDIST,4,ISTAT,2H1 ,IFOUND,IZERO)
0259            CALL DBERF(49)
0260            IOK=0
0261            I=0
0262            RNEW=0.
0263            OLD=0.
0264            DO 20 J=1,100
0265            RMACH(J,1)=0.
0266            RMACH(J,2)=0.
0267       20   CONTINUE
0268            DO 25 J=1,300
0269            RNEW=RNEW+RESID(J)
0270       25   CONTINUE
0271       10   CALL DBGET(IBASE,5HWDIST,2,ISTAT,2H@ ,IFOUND,IARG)
0272            IF(ISTAT(1).EQ.12) GOTO 100
0273            CALL DBERF(50)
0274            CALL MOVEW(IFOUND(MDIST),VARY,2)
0275            DELTA=ABS(VARY-TDIST)
0276            IF(DELTA.GT.200.) GOTO 10
0277            I=I+1
0278            WRITE(LU,9999) VARY,DELTA,TDIST
0279     9999   FORMAT(1H ,"VARY "F10.8," DELTA "F10.8" TDIST "F10.8/)
0280       200  CALL MOVEW(VARY,RMACH(I,2),2)
0281            CALL DBFND(IBASE,5HSPOKE,1,ISTAT,6HWRDIST,VARY)
0282            IF(ISTAT(1).EQ.107.OR.ISTAT(1).EQ.156) GOTO 10
0283            CALL DBERF(41)
0284            CALL DBGET(IBASE,5HSPOKE,5,ISTAT,2H@ ,IFOUND,VARY)
0285            CALL DBERF(40)
0286            CALL MOVEW(IFOUND(MRESID),RFOUND,255)
0287            DO 250 J=1,300
0288            OLD=OLD+RFOUND(J)
0289       250  CONTINUE
0290            DIFF(I)=(ABS((RNEW**2)-(OLD**2)))**.5
0291            CALL MOVEW(DIFF(I),RMACH(I,1),2)
0292            IOK=1
0293            GOTO 10
0294      C
0295       100  IF(I.EQ.1) GOTO 180
0296            DO 150 L=1,I-1
0297            T1(1)=RMACH(L,1)
0298            T1(2)=RMACH(L,2)
0299            DO 175 K=L+1,I
0300            T2(1)=RMACH(K,1)
0301            T2(2)=RMACH(K,2)
0302            IF(T1(1).LT.T2(1)) GOTO 175
0303       170  RMACH(L,1)=T2(1)
0304            RMACH(L,2)=T2(2)
0305            RMACH(K,1)=T1(1)
0306            RMACH(K,2)=T1(2)
0307            CALL MOVEW(T2,T1,4)
0308       175  CONTINUE
0309       150  CONTINUE
0310            IF(IOK.EQ.1) GOTO 180
0311       155  WRITE(LU,603)
```

```
0312        600 FORMAT(1H ,"I CAN'T RECOGNIZE WHAT YOU ARE SAYING ???")
0313            GO TO 350
0314        180 CALL DBFND(IBASE,5HSPOKE,1,ISTAT,6HWRDIST,RMACH(1,2))
0315            WRITE(LU,999) (RMACH(J,2),J=1,I)
0316        999 FORMAT(1H ,"REACHED FIND ITEM - MATCH VALUE = ",F10.8/)
0317            IF(ISTAT(1).EQ.107.OR.ISTAT(1).EQ.156) GOTO 155
0318            CALL DBERF(44)
0319            CALL DBGET(IBASE,5HSPOKE,5,ISTAT,2H@ ,IFOUND,RMACH(1,2))
0320            CALL DBERF(45)
0321            CALL MOVEW(IFOUND(3),LBUF,24)
0322            WRITE(LU,300) LBUF
0323        300 FORMAT(1H ,"I RECOGNIZE THE WORD ---  "24A2)
0324        350 WRITE(LU,400)
0325        400 FORMAT("DO YOU WISH TO QUIT (YES OR NO) ?")
0326            READ(LU,5) IANS
0327          5 FORMAT(A2)
0328            IF(IANS.EQ.2HNO) GOTO IRTN
0329            CALL DBCLS(IBASE,DUMMY,1,ISTAT)
0330            STOP
0331         99 CALL VOICE
0332            END
0333            PROGRAM VOINF(5)
0334            COMMON/I99/INITR/C99/ICNTR
0335            COMMON/GLOBL/IARRY(2000),ISTAT(10),ISCTR,ISECT,ISTRK,IWORC(24)
0336           *AUTOK(20),R(20),A(20,20),REFLC(20),ALPHA(20),RDIST(20),
0337           *RESID(300),TDIST,IPRAM(5),IBASE(8),IRTN,IDISC,IEND,
0338           *IP,IW,IRECOG,LU,ILIST(45),LISTI(45),IBUF(45,6),
0339           *NDIST,MDIST,
0340           *NPHR1,MPHR1,
0341           *NWRDIS,NPHR2,NRESID,
0342           *MWRDIS,MPHR2,MRESID,
0343           *NPHR3,NRAUTO,NGAIN,
0344           *MPHR3,MRAUTO,MGAIN
0345      C
0346      C
0347         20 CALL DBOPN(IBASE,6HSYSMGR,1,ISTAT)
0348            CALL DBERF(4)
0349      C
0350            CALL INFDB(5HWDIST)
0351            NDIST=IABS(LISTI(2))
0352            MDIST=1
0353      C
0354         30 CALL INFDB(5HREP  )
0355            NPHR1=IABS(LISTI(2))
0356            MPHR1=1
0357      C
0358         40 CALL INFDB(5HSPOKE)
0359            NWRDIS=IABS(LISTI(2))
0360            MWRDIS=1
0361            NPHR2=IABS(LISTI(3))
0362            MPHR2=MWRDIS+IBUF(1,4)
0363            NRESID=IABS(LISTI(4))
0364            MRESID=MPHR2+IBUF(2,4)
0365      C
0366         50 CALL INFDB(5HSPEAK)
0367            NPHR3=IABS(LISTI(2))
0368            MPHR3=1
0369            NRAUTO=IABS(LISTI(3))
0370            MRAUTO=MPHR3+IBUF(1,4)
0371            NGAIN=IABS(LISTI(4))
0372            MGAIN=MRAUTO+IBUF(2,4)
0373        110 GO TO IRTN
0374         99 CALL VOICE
0375            END
0376            SUBROUTINE INFDB(ISET)
0377            COMMON/I99/INITR/C99/ICNTR
0378            COMMON/GLOBL/IARRY(2000),ISTAT(10),ISCTR,ISECT,ISTRK,IWORC(24)
```

```
0379        *AUTOK(20),R(20),A(20,20),REFLC(20),ALPHA(20),RDIST(20),
0380        *RESID(300),TDIST,IPRAM(5),IBASE(8),IRTN,ICISC,IEND,
0381        *IP,IW,IRECOG,LU,ILIST(45),LISTI(45),IBUF(45,6),
0382        *NDIST,MDIST,
0383        *NPHR1,MPHR1,
0384        *NWRDIS,NPHR2,NRESID,
0385        *MWRDIS,MPHR2,MRESID,
0386   D    *NPHR3,NRAUTO,NGAIN,
0387        *MPHR3,MRAUTO,MGAIN
0388   C
0389   C
0390        DIMENSION LISTJ(65),ISET(3)
0391   C
0392        CALL DBINF(IBASE,ISET,104,ISTAT,LISTI)
0393        IF(ISTAT(1).NE.0) CALL DBERF(6)
0394   D    WRITE(6,1001)(ISET(I),I=1,3)
0395  D1001 FORMAT(1H ,5X,(3(A2)))
0396        N=LISTI(1)
0397        IF(N.GT.200) CALL DBERF(7)
0398        LENGTH=1
0399        DO 100 I=2,N
0400        M=I-1
0401        CALL DBINF(IBASE,IABS(LISTI(I)),102,ISTAT,LISTJ)
0402        IF(ISTAT(1).NE.0) CALL DBERF(8)
0403        IBUF(M,1)=LISTJ(1)
0404        IBUF(M,2)=LISTJ(2)
0405        IBUF(M,3)=LISTJ(3)
0406        IBUF(M,4)=LISTJ(10)*LISTJ(11)
0407        IF(LISTJ(9).EQ.2HX ) IBUF(M,4)=IBUF(M,4)/2
0408        IBUF(M,5)=LENGTH
0409        LENGTH=LENGTH+IBUF(M,4)
0410    100 CONTINUE
0411        END
0412        PROGRAM VOCER(5)
0413        COMMON/I99/INITR/C99/ICNTR
0414        COMMON/GLOBL/IARRY(2000),ISTAT(10),ISCTR,ISECT,ISTRK,IWORD(24),
0415        *AUTOK(20),R(20),A(20,20),REFLC(20),ALPHA(20),RDIST(20),
0416        *RESID(300),TDIST,IPRAM(5),IBASE(8),IRTN,ICISC,IEND,
0417        *IP,IW,IRECOG,LU,ILIST(45),LISTI(45),IBUF(45,6),
0418        *NDIST,MDIST,
0419        *NPHR1,MPHR1,
0420        *NWRDIS,NPHR2,NRESID,
0421        *MWRDIS,MPHR2,MRESID,
0422        *NPHR3,NRAUTO,NGAIN,
0423        *MPHR3,MRAUTO,MGAIN
0424   C
0425   C
0426        DIMENSION JPRAM(5)
0427        CALL RMPAR(JPRAM)
0428        WRITE(LU,10) JPRAM(1),ISTAT(1)
0429     10 FORMAT(1H ,"ROUTINE  ",I4," CAUSED ERROR  ",I4/)
0430        CALL DBCLS(IBASE,DUMMY,1,ISTAT)
0431        STOP
0432     99 CALL VOICE
0433        END
```

We claim:

1. An apparatus for matching a presently spoken speech utterance with a corresponding one of a desired plurality of previously spoken speech utterances comprising:

signal quantizing means having an output terminal, and an input terminal for receiving analog input signals representing spoken speech utterances including a desired plurality of previously spoken speech utterances and a presently spoken speech utterance, said signal quantizing means quantizing said analog input signal on its input terminal into a binary value on its output terminal;

sampling means having an output, and an input connected to the output terminal of said signal quantizing means, said sampling means periodically sampling the binary value on the output terminal of said quantizing means and placing on its output, said binary value in a string of binary bits having a predetermined number of bits;

buffer means having an output, and an input connected to the output of said sampling means, said buffering means storing each complete string of binary bits appearing on the output of said sampling means in a sequential fashion throughout the duration of said analog input signal on the input terminal of said quantizing means such that the number of said strings for a particular one of said spoken speech utterances is dependent upon the duration of said analog input signal;

analyzing means having a storage interconnect, an output, and an input connected to the output of said buffer means, said analyzing means determining autocorrelation functions of each of said strings of binary bits of said spoken speech utterances stored in said buffer means, determining linear predictive coefficients of said autocorrelation functions for each of said spoken speech utterances, and placing said linear predictive coefficients on the output of said analyzing means;

storage means connected to the storage interconnect of said analyzing means, said storage means successively storing said linear predictive coefficients and identifying data for each of said desired plurality of previously spoken speech utterances; and said analyzing means further including means calculating distance measures between the linear predictive coefficients of said presently spoken speech utterance and the linear predictive coefficients of selected ones of said desired plurality of previously spoken speech utterances stored in said storage means, means finding the minimum values of said distance measures, and means for placing on the output of said analyzing means, the identifying data stored for the previously spoken speech utterance corresponding to said minimum values of said distance measures, thereby matching said presently spoken speech utterance with a corresponding one of said desired plurality of previously spoken speech utterances.

2. A method for matching a presently spoken speech utterance with a corresponding one of a desired plurality of previously spoken speech utterances comprising the steps of:

a. quantizing an analog input signal representing a spoken speech utterance into a binary value;
b. periodically sampling said binary value;
c. placing said binary value in a string of binary bits having a predetermined number of bits;
d. repeating steps b and c for the duration of said analog input signal such that the number of said strings is dependent upon the duration of said analog input signal;
e. determining autocorrelation functions of each of said strings of binary bits of said spoken speech utterance;
f. determining linear predictive coefficients of said autocorrelation functions of said spoken speech utterance;
g. storing said linear predictive coefficients and identifying data for said spoken speech utterance;
h. repeating steps a-g until linear predictive coefficients and identifying data for each spoken speech utterance of a desired plurality of previously spoken speech utterances is stored;
i. repeating steps a-f for a presently spoken speech utterance;
j. calculating distance measures between the linear predictive coefficients of said presently spoken speech utterance and the linear predictive coefficients of selected ones of said desired plurality of previously spoken speech utterances stored in said storage means;
k. finding the minimum values of said distance measures;
l. providing said identifying data stored for the spoken speech utterance corresponding to said minimum values of said distance measures, thereby matching said presently spoken speech utterance with a corresponding one of said desired plurality of previously spoken speech utterances.

3. A method according to claim 2 further comprising: determining the linear predictive coefficients ($a'_k$) of the autocorrelation function of a string of bits ($y(n)$) in accordance with $$y(n) = -\sum_{k=1}^{p} a'_k y(n-k),$$

where p is the number of poles of an all-pole linear prediction filter model.

4. A method according to claim 3, wherein the step of determining a distance measure is accomplished by evaluating the distance measure in accordance with $$d = \frac{\sum_{k=1}^{p} a_k R(k)}{\sum_{k=1}^{p} a'_k R'(k)}.$$

* * * * *